US008213790B2

(12) United States Patent
Hinderthür (10) Patent No.: US 8,213,790 B2
(45) Date of Patent: Jul. 3, 2012

(54) METHOD AND DEVICE FOR THE 1+1 PROTECTION OF AN OPTICAL TRANSMISSION PATH

(75) Inventor: Henning Hinderthür, Finning (DE)

(73) Assignee: ADVA AG Optical Networking, Meiningen (DE)

( * ) Notice: Subject to any disclaimer, the term of this patent is extended or adjusted under 35 U.S.C. 154(b) by 169 days.

(21) Appl. No.: 12/783,910

(22) Filed: May 20, 2010

(65) Prior Publication Data
US 2010/0296808 A1    Nov. 25, 2010

(30) Foreign Application Priority Data

May 22, 2009 (DE) .................... 10 2009 022 365

(51) Int. Cl.
*H04J 14/00* (2006.01)
(52) U.S. Cl. .............. 398/5; 398/3; 398/17; 398/16; 398/33
(58) Field of Classification Search .......... 398/5, 3, 398/4, 17, 16, 20, 33, 30
See application file for complete search history.

(56) References Cited

U.S. PATENT DOCUMENTS

| | | | | |
|---|---|---|---|---|
| 5,886,801 A * | 3/1999 | Van Deventer | | 398/59 |
| 5,903,370 A * | 5/1999 | Johnson | | 398/4 |
| 5,903,371 A * | 5/1999 | Arecco et al. | | 398/4 |
| 6,580,530 B1 * | 6/2003 | Arecco et al. | | 398/5 |
| 6,973,267 B1 * | 12/2005 | Arecco et al. | | 398/4 |
| 7,072,580 B2 * | 7/2006 | Arecco et al. | | 398/4 |
| RE39,378 E * | 11/2006 | Dugan et al. | | 398/95 |
| 7,613,392 B2 * | 11/2009 | Gerstel | | 398/5 |
| 7,778,544 B2 * | 8/2010 | Hinderthur | | 398/25 |
| 7,945,160 B2 * | 5/2011 | Hinderthur | | 398/33 |
| 8,078,052 B2 * | 12/2011 | Aprile et al. | | 398/15 |
| 2001/0021045 A1 * | 9/2001 | Tervonen et al. | | 359/110 |
| 2003/0016654 A1 | 1/2003 | Das et al. | | |
| 2007/0195693 A1 * | 8/2007 | Li | | 370/217 |
| 2009/0060504 A1 * | 3/2009 | Chang et al. | | 398/48 |
| 2010/0080553 A1 * | 4/2010 | Kerr et al. | | 398/5 |
| 2010/0284687 A1 * | 11/2010 | Tanzi et al. | | 398/1 |

OTHER PUBLICATIONS

Sato et al., "Economical and Reliable SDH Optical Transmission System: Introduction of Newly Developed Module AY," NTT Review, Nov. 1995, pp. 80-84, vol. 7 , No. 6, Tokyo, Japan (5 pages).

* cited by examiner

*Primary Examiner* — Kenneth N Vanderpuye
*Assistant Examiner* — Hibret Woldekidan
(74) *Attorney, Agent, or Firm* — The Culbertson Group, P.C.

(57) ABSTRACT

The present invention encompasses a method for 1+1 protection of an optical transmission path comprising a working path and a protection path that connect a first and second terminal node. In a working mode, an optical transmission signal is transmitted via the working path from the first to the second terminal node. At the second terminal node, the optical transmission signal is split into two optical sub-signals, and one of the optical sub-signals is sent via the protection path to a protection-path connection node as a working-path control signal. In the case of an interruption of the signal transmission via the working path, the protection-path connection node detects the absence of the working-path control signal and switches the system from the working mode to a protection mode in which signal transmission is conducted via a separate protection path.

15 Claims, 4 Drawing Sheets

METHOD AND DEVICE FOR THE 1+1 PROTECTION OF AN OPTICAL TRANSMISSION PATH

FIELD OF THE INVENTION

The present invention relates to a method and device for optical networking, and more particularly to a method and device for the 1+1 protection of an optical transmission path.

BACKGROUND

In order to increase the operational reliability of an optical transmission path, for example, with respect to the destruction of an optical waveguide connecting the two terminal nodes of the transmission path, it is known to provide a complete replacement path (protection path) for a working path, wherein, in the case of an interruption in the working path, the transmission is switched to the protection path. This case is called 1+1 protection.

For such 1+1 protection, the switching from the working path to the protection path is constructed such that the loss of the optical signal transmission via the working path is detected, and then the transmission is switched within a specified switchover time to the protection path. As the switchover time, for example, a maximum value of 50 ms is acceptable.

The detection of the functionality or the loss of the signal transmission via the working path is typically detected in the terminal nodes of the transmission path. Because the terminal nodes are typically located at the subscriber or at the customer of a network provider, it is necessary in such known transmission paths with 1+1 protection to install suitable active equipment at the site of the customer. In the case that a loss of the working path is detected, this equipment can generate a corresponding error signal and transmit this error signal to a network-management system that switches the transmission of the optical signal to the protection path. For this purpose, for example, in the terminal node, there can be a separate optical transmitter unit for signal transmission via a protection path connected to this node. Alternatively, the optical transmission signal may be fed by means of an optical switch, if necessary, to the working path or to the protection path.

A disadvantage in these known transmission paths with 1+1 protection, however, is the time and effort required with regard to the terminal node, i.e., at the site of the customer, for installing active equipment for switching the signal transmission from the working path to the protection path or vice versa. This is associated with an increase in the costs for the equipment technology at the site of the customer. In addition, this produces an increase in the costs for servicing the active equipment at the site of the customer.

SUMMARY OF THE INVENTION

The techniques herein provide a method for the 1+1 protection of an optical transmission path and a correspondingly constructed optical transmission path with 1+1 protection, wherein, at the site of the customer, the use of active technology can be eliminated. In addition, the transmission path is constructed so that, in the case of the loss of a transmission path, i.e., for the loss of the signal transmission via the working path or the signal transmission via the protection path, the necessary switching processes can be performed without complicated communications via a network management channel.

Provided is a 1×2 splitter unit in each of the terminal nodes at each end of a transmission path to enable the optical signal to be transmitted and fed simultaneously to the working path and to the protection path. In the receiving terminal node, either the signal transmitted via the working path or the signal transmitted via the protection path is recombined and further processed by means of the relevant 1×2 splitter unit. By means of a protection-path connection node provided in the protection path, the optical signal fed to the receiving terminal node can be fed to the protection-path connection node as a split sub-signal that is designated below as the east-side working-path control signal. Thus, this east-side working-path control signal can be detected in the protection-path connection node. The protection-path connection node is constructed so that it can be enabled or disabled with respect to the transmission of the optical signal from the first terminal node to the second (receiving) terminal node. In the protection-path connection node, if the east-side working-path control signal is detected as present, then the signal transmission via the protection path in the relevant direction (to the second terminal node) is disabled. If the working path is interrupted, for example, by the destruction of a corresponding optical waveguide, then the working-path control signal is omitted that, in the normal case (for correct signal transmission via the working path) is transmitted as a sub-signal from the relevant port of the 1×2 splitter unit in the receiving terminal node via the relevant part of the protection path to the protection-path connection node. The absence of the working-path control signal is detected in the protection-path connection node, whereupon the signal transmission via the protection path is enabled in the direction of the relevant terminal node.

For this purpose, a control unit must be provided only in the protection-path connection node, with this control unit having a detector unit for detecting the east-side working-path control signal and a means for enabling or disabling the signal transmission in the protection-path connection node in the direction of the relevant terminal node.

Thus, it is possible according to the invention to eliminate active equipment in the terminal node, i.e., at the site of the customer. In addition, all that is necessary is to provide a control unit with the mentioned functions in the protection-path connection node. The protection-path connection node is typically provided at a site of the network operator at which suitable equipment must otherwise be provided.

Such a transmission path may also be operated in a bidirectional mode. If the transmission in the working path and the protection path takes place via one and the same optical waveguide (single-fiber working path), then in the protection-path connection node, only one additional detector unit must be provided for detecting a west-side working-path control signal. This involves a sub-signal generated by splitting the optical signal received on the receiving first terminal node. While one sub-signal is further processed in the relevant node as a reception signal, the other sub-signal is transmitted to the protection-path connection node via the protection path between the splitter unit and the west-side port of the protection-path connection node. Because the normal optical transmission signal transmitted from the first terminal node continuously both via the working path and also via the relevant part of the protection path in the direction of the second terminal node is also guided on this segment of the protection path, it is necessary to perform the signal transmission in the two opposing transmission directions (i.e., from the first terminal node to the second and vice versa) under the use of optical carrier wavelengths that can be distinguished from each other. However, this applies only for the case of the single-fiber working path.

In the case of a dual-fiber working path, the first terminal node and the second terminal node are connected to each other by means of two separate optical paths, both for the working path and for the protection path, wherein each of the two paths is used for signal transmission each in a single direction, i.e., either for the signal transmission from the first terminal node to the second or vice versa.

In this case, the transmission of the signals can be performed in both directions between the terminal nodes with the same optical carrier wavelength. This is because, for the case that the signal transmission functions correctly via the working path, the signal transmission via the protection path is disabled. In this case, only the west-side or east-side working-path control signal is guided on the connection piece between the relevant 1×2 splitter unit in the receiving terminal node and the west-side or east-side port of the protection-path connection node. Thus, disruptive signal interference cannot occur on this signal path.

At this point it should be mentioned that, in the case of a bidirectional transmission path with a dual-fiber working path, two 1×2 splitter units are provided in each terminal node, wherein one port of the splitter unit is connected to the relevant transmitting or receiving equipment of the terminal node and the two other ports of the splitter unit are connected to the relevant working path or additional working path or to the protection path or to the additional protection path.

A connection node is also provided in the working path in order to achieve further improved flexibility with respect to the selection of the signal paths for the transmission between the two terminal nodes. In this working-path connection node, a separate control unit is also provided that has at least one detector unit for detecting an east-side protection-path control signal. This protection-path control signal is fed to the working-path connection node as a sub-signal generated by means of the relevant splitter unit in the second terminal node. This sub-signal thus corresponds to the optical reception signal that is received by the second terminal node. If this east-side protection-path control signal is detected as present, then, in the working-path connection node, it is assumed that a correct signal transmission took place via the protection path. If the loss of the east-side protection-path control signal is determined in the working-path connection node, then it can thus be assumed that the signal transmission via the working path must be enabled in the direction of the second terminal node. In this case, the control unit in the working-path connection node controls the means for enabling the signal transmission in the relevant direction so that the signal transmission is enabled.

In the case of bidirectional signal transmission, the working-path connection node also has a detector unit for detecting a west-side protection-path control signal. This west-side protection-path control signal is fed to the working-path connection node via the working path between the relevant port of the 1×2 splitter unit in the first terminal node and the west-side port of the working-path connection node.

In the case of the dual-fiber working path for realizing a bidirectional transmission path, the protection signal transmitted between the protection-path connection node and the first terminal node or the second terminal node can have a different optical carrier wavelength than the other optical transmission signals. In this way it is possible to distinguish in the receiver unit in the first terminal node or in the second terminal node whether the received signal is transmitted via the working path or the protection path. In addition, the operational reliability increases somewhat for the case that the signal transmission takes place incorrectly both via the working path and also (simultaneously) via the protection path. This is because, in this case, two signals with the same optical carrier frequency were transmitted in different transmission directions in the path between the corresponding connection node and the corresponding terminal node. In this case, it would lead to incorrect reception in the relevant terminal node in each case, because the two optical signals transmitted simultaneously via the working path and via the protection path would interfere with each other (an exactly equal signal propagation time can be guaranteed under no circumstances). In addition, for the relevant detector unit in the corresponding connection node, it is no longer possible in a simple way to detect the reception of an east-side or west-side protection-path control signal or an east-side or west-side working-path control signal, because in this path, two signals with the same optical carrier wavelength exist at the same time, even when they run in opposite directions. This is because, in the simplest case, the detector unit is realized by the use of an optical coupler that diverts a sub-signal from the relevant optical path. This sub-signal would no longer be caused exclusively by the corresponding control signal for the simultaneous transmission of signals in opposite directions. Therefore it would no longer be possible to correctly detect the control signal. In this case, however, it would be possible to use instead of a simple optical coupler (a 1×2 splitter unit), an optical circulator. In this way, the directional dependency of the signal transmission can be taken into account and only the signal guided in the direction of the relevant connection node, i.e., the corresponding control signal, can be decoupled for the detector unit.

However, for the signal transmission from the protection-path connection node in the direction of the first terminal node or second terminal node, an optical signal with an optical carrier wavelength is used that differs from the optical carrier wavelength of the other signals, so these problems can be easily solved in that, for the detector units both in the protection-path connection node and also in the working-path connection node, wavelength-sensitive 1×2 splitter units are used.

This can be achieved in a simple way in that, in each connection node, the received signals are opto-electrically converted and if necessary fed to signal processing or conditioning before the correspondingly processed or conditioned signals are fed to a transmitter unit that converts the relevant electrical signal back into an optical transmission signal with the desired optical carrier wavelength. In practice, however, this means no extra expense, because processing in a network node is typically performed without such opto-electrical and then electro-optical signal conversion.

The use of optical signals with different optical carrier wavelengths also means in practice no extra expense, because the optical receiver units typically operate in broadband and consequently do not have to be adapted to reception signals with different optical carrier wavelengths. This also applies for the optical receiver units of the detector units for the detection of the control signals.

The presence of an opto-electrical and then electro-optical signal conversion also provides the advantage that the means for enabling/disabling the signal transmission in the desired direction can be realized simultaneously in the desired direction in the protection-path connection node or in the working-path connection node. The control unit must only enable or disable the corresponding transmitter units.

According to one embodiment of the invention, for the detection of the loss of a control signal, the control unit can also consider additional, necessary conditions for the enabling of the signal transmission in the necessary transmission direction. For example, the control unit may enable signal transmission in the corresponding connection node (the requirement of enabling as a result of the loss of the relevant control signal is assumed) only when the control unit determines that an optical signal to be switched through is fed with sufficient quality to the corresponding connection node. For example, for this purpose, the signal-to-noise ratio or the bit-error rate may be measured in the control unit and the signal transmission may be switched through only when the signal quality reaches or exceeds a prescribed level.

The invention will be further explained in detail below with reference to embodiments shown in the drawings.

DETAILED DESCRIPTION OF ILLUSTRATIVE EMBODIMENTS

Figure 1:
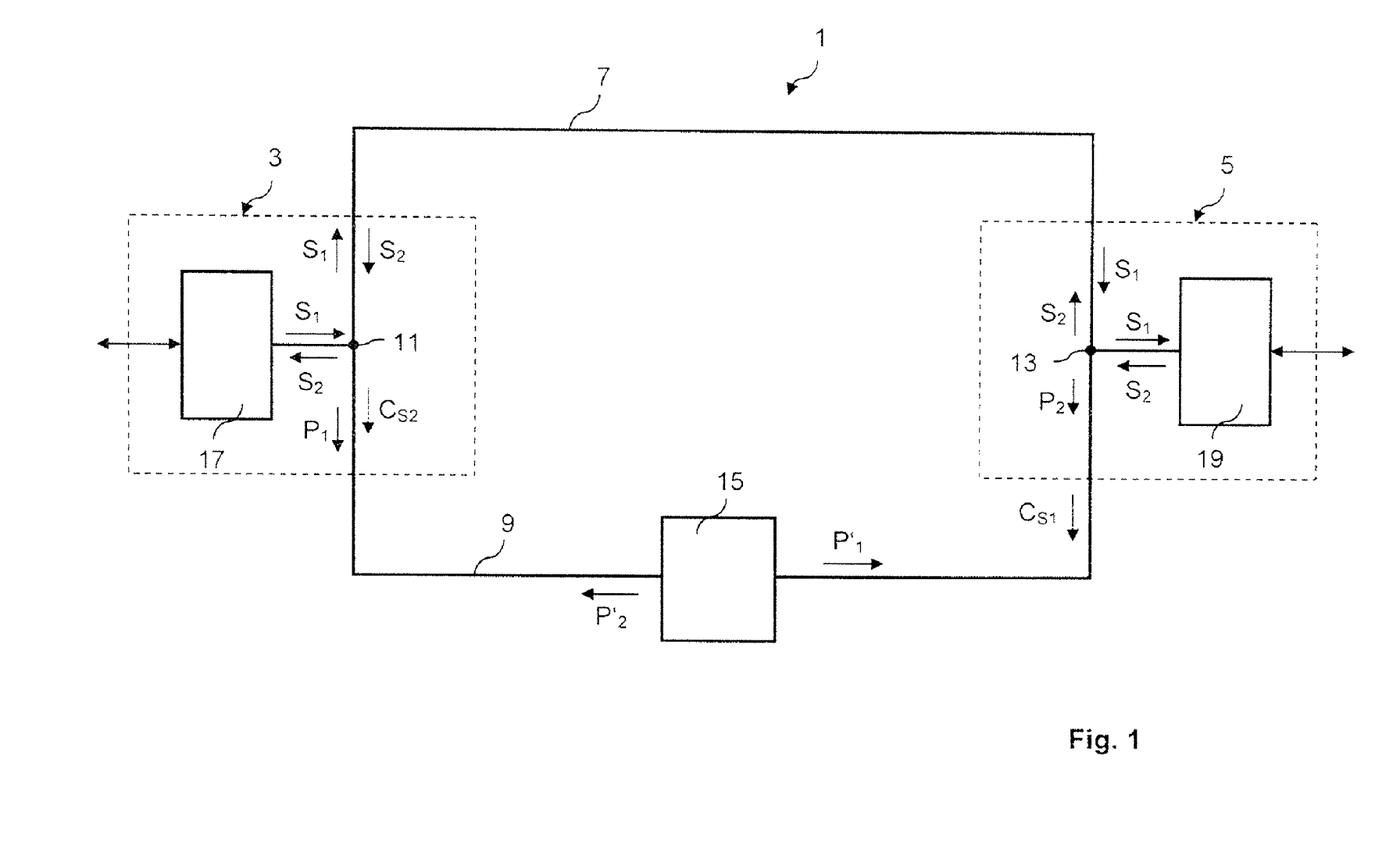
FIG. 1 is a first embodiment of a transmission path according to the invention with 1+1 protection for signal transmission with a single-fiber working-path connection node and a protection-path connection node.

FIG. 1 shows an optical transmission path 1 including a first terminal node 3 that is connected to a second terminal node 5 via a working path 7 and via a protection path 9. In each terminal node 3, 5 there is a splitter unit 11 and 13, respectively, whose node-side port is connected to a node control unit 17 and 19, respectively. The node control units 17, 19 comprise, if necessary, a transmitter unit, receiver unit, and optional, additional units for signal processing or conditioning. The two path-side ports of the splitter units 11, 13 are each connected to the relevant end of the working path or the protection path 7, 9. In the protection path 9, a protection-path connection node 15 is provided. The node control units 17, 19 or the terminal nodes 3, 5 can also be connected, as indicated by the relevant arrows, to higher-level units or a downstream or upstream transmission path.

The embodiment of an optical transmission path 1 according to FIG. 1 relates to a bidirectional transmission path with a single-fiber working path. Instead of bidirectional signal transmission, only mono-directional signal transmission may also be provided.

As is clear from FIG. 1, in the first terminal node 3, the node control unit 17 generates an optical transmission signal $S_1$ fed to the splitter unit 11 at their node-side port. This signal is optically split, wherein one sub-signal that is designated for the sake of simplicity also with $S_1$ is fed to the working path 7 and the other sub-signal that is designated with $P_1$ is fed to the protection path 9. The signal $S_1$ is transmitted via the working path 7 to the second terminal node 5 or to its splitter unit 13. One of the split sub-signals is fed to the node control unit 19 at the node-side port. This signal is designated for the sake of simplicity also with $S_1$.

The additional sub-signal is fed on the path-side port of the splitter unit 13 as signal $C_{S1}$, via the protection path to the east-side port of the protection-path connection node 15. The sub-signal $C_{S1}$ is designated as the east-side working-path control signal.

The signal $P_1$ fed to the protection-path connection node 15 at its west-side port can be transmitted by the protection-path connection node 15 if necessary as signal $P'_1$ in the direction of the splitter unit 13 of the second terminal node 5. For this purpose, the protection-path connection node 15 comprises a detector unit that detects the presence of the east-side working-path control signal $C_{S1}$ that is transmitted, in the normal operating mode of the transmission path, i.e., in the working mode, via the working path 7 from the first terminal node 3 to the second terminal node 5. In this working mode, the signal transmission via the protection-path connection node in the direction of the second terminal node 5 is disabled.

The function of the protection-path connection node 15 is realized by a control unit that is present in this node and that also comprises the detector unit for detecting the control signal $C_{S1}$. If the control unit determines by means of the detector unit that the control signal $C_{S1}$ is absent, then it is assumed that the signal transmission via the working path is not performing correctly or has failed, for example, as a consequence of the destruction of the optical waveguide that implements the working path 7. In this case, the control unit of the protection-path connection node 15 controls means for enabling/disabling the signal transmission in the direction of the second terminal node 5 so that the signal transmission is enabled. In this case, the protection-path connection node 15 outputs an optical signal $P'_1$ in the direction of the second terminal node 5. This signal can have a different optical carrier wavelength relative to the reception signal $P_1$ of the protection-path connection node 15. This is not absolutely necessary, however, when the transmission path 1 is operated only in mono-directional mode or when, in the case of bidirectional transmission in the single-fiber working path, the transmission signals have, in the two terminal nodes 3, 5, optical carrier wavelengths that are different from each other in advance.

In the case of the embodiment shown in FIG. 1 for bidirectional transmission in the single-fiber working path, the signal transmission from the second terminal node 5 to the first terminal node 3 occurs in an analogous way. For this purpose, an optical transmission signal $S_2$ generated by the node control unit 19 is split by means of the optical splitter unit 13 into two sub-signals, wherein the sub-signal fed to the working path 7 is designated, in turn, for the sake of simplicity with $S_2$. The sub-signal fed to the protection path 9 is designated with $P_2$. In the first terminal node 3, the signal $S_2$ is fed to the relevant path-side port of the splitter unit 11. One of the split sub-signals is fed to the node control unit 17 and received or further processed by this unit. This signal is designated, in turn, for the sake of simplicity with $S_2$. The other optical sub-signal is designated with $C_{S2}$) and is fed via the relevant path-side port of the splitter unit 11 to the protection path 9. Here, it involves the west-side working-path control signal $C_{S2}$ fed to the west-side port of the protection-path connection node 15.

In the protection-path connection node 15, a detector unit is also provided for detecting this west-side working-path control signal $C_{S2}$ and can be contained by the control unit of the protection-path connection node.

The protection-path connection node 15 also comprises a means for enabling/disabling the signal transmission of the signal $P_2$ as signal $P'_2$ in the direction of the first terminal node 3. As in the case of the signal transmission explained at first from the first terminal node to the second terminal node, the signal $P'_2$ can have a different optical carrier wavelength than the signal $P_2$. The preceding explanations for the other transmission direction apply here analogously.

In this embodiment according to FIG. 1, it can thus be guaranteed that signal transmission in normal mode, i.e., in working mode, is switched to signal transmission in protection mode, when the control unit in the protection-path connection node determines that the signal transmission via the working path 7 is noisy. In the case of bidirectional transmission in the single-fiber working path, if working path 7 is defective, both transmission directions are switched simultaneously to the protection path.

Figure 2:
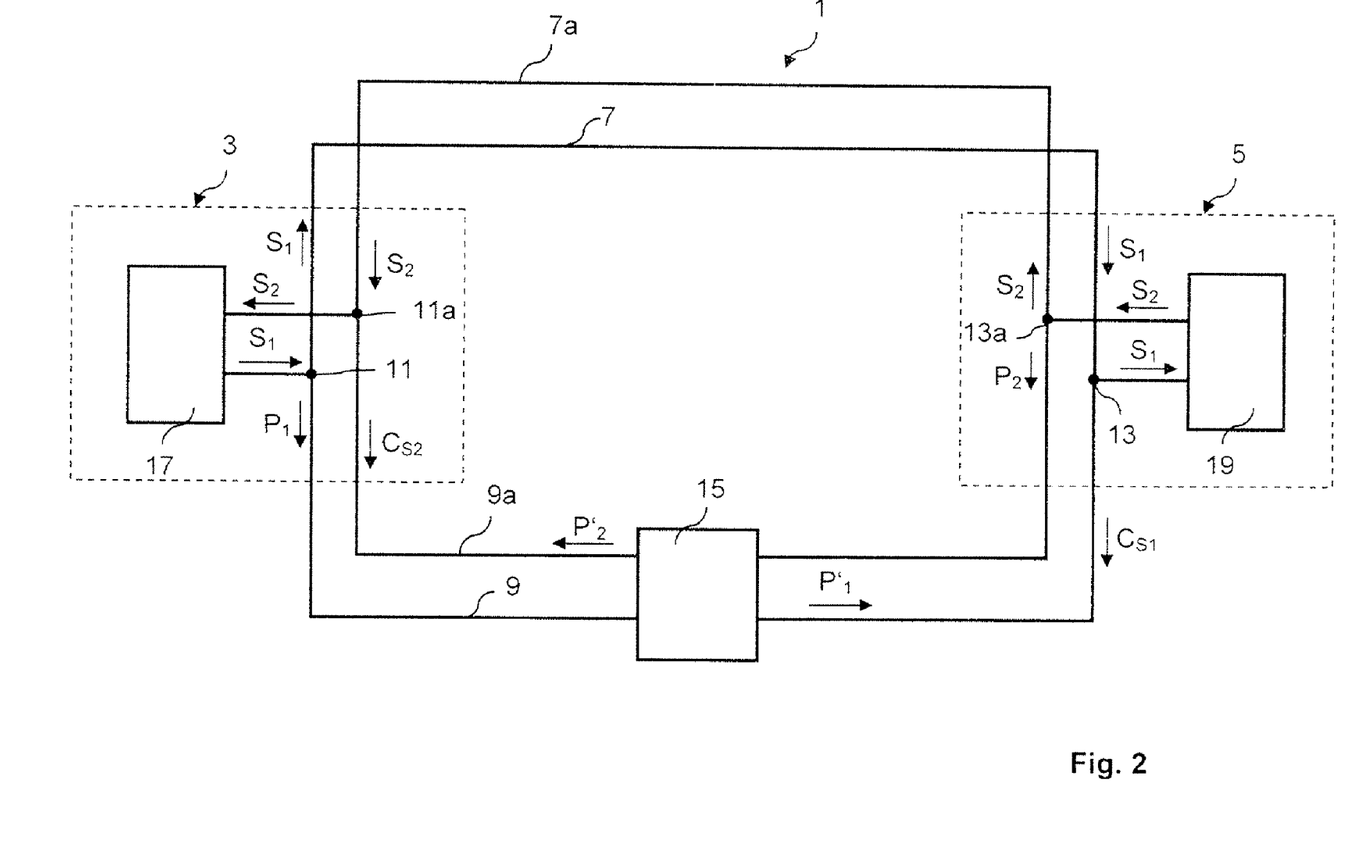
FIG. 2 is an embodiment similar to that shown in FIG. 1, but for bidirectional signal transmission in a dual-fiber working path.

FIG. 2 shows a transmission path 1 in which the working path 7 and the protection path 9 are used for transmission only from the first terminal node 3 to the second terminal node 5. For the transmission in the opposite direction, an additional working path 7a and an additional protection path 9a are provided that are connected in the first and second terminal nodes 3, 5 via an additional optical splitter unit 11a, 13a. The node-side ports of the additional splitter units 11a, 13a are each connected to corresponding ports of the node control units 17, 19. Thus, the following functioning of the bidirectional transmission path according to FIG. 2 is produced.

The node control unit 17 generates an optical transmission signal $S_1$ fed via the splitter unit 11 as a sub-signal $S_1$ to the working path 7 and as sub-signal $P_1$ to the protection path 9. In the second terminal node 5, the signal S is split by means of the splitter unit 13, wherein one of the sub-signals is fed as signal $S_1$ to the node control unit 19 as the reception signal. The other sub-signal is fed as the east-side working-path control signal $C_{S1}$ to the protection path 9 and thus to the east-side port of the protection-path connection node 15. In this case, the detector unit in the connection node 15 also detects the control signal $C_{S1}$. The control unit of the connection node 15 can then switch through the signal transmission in the direction of the second terminal node, as in the case of the embodiment according to FIG. 1, for the detection of the loss or absence of the control signal $C_{S1}$. In this case, the protection-path connection node 15 can also generate a switched-through optical signal $P'_1$ that has a different optical carrier wavelength relative to the signal $P_1$ fed to it. In this way, in the node control unit 19 it can be determined with reference to the wavelength of the reception signal whether the signal was transmitted via the working path or the protection path.

The problem produced for simultaneous signal transmission both via the working path 7 and via the protection path 9 as stated above in connection with FIG. 1 can also be solved, especially with respect to the simple detection of the control signal $C_{S1}$.

For the signal transmission from the second terminal node 5 to the first terminal node 3, the node control unit 19 in the second terminal node 5 generates an optical transmission signal $S_2$ that is fed to the additional, optical splitter unit 13a. This signal is fed as sub-signal $S_2$ to the additional working path 7a and as sub-signal $P_2$ to the additional protection path 9a.

In the first terminal node 3, the signal $S_2$ is split by means of the additional optical splitter unit 11a, wherein one sub-signal is fed as the reception signal $S_2$ to the node control unit 17 for reception and for further processing. The other sub-signal is fed as the west-side working-path control signal $C_{S2}$ to the protection path 9a and thus to the relevant west-side port of the protection-path connection node 15.

If the control unit that also comprises the detector unit in the protection-path connection node detects a loss or absence of the control signal $C_{S2}$, then it is assumed that the signal transmission via the additional working path 7a is noisy. In this case, the control unit of the protection-path connection node 15 controls means for enabling/disabling the signal transmission in the direction of the first terminal node 3 so that the signal transmission is disabled.

As shown in FIG. 2, the signal $P'_2$ transmitted from the protection-path connection node 15 can have a different optical carrier wavelength than the sub signal $P_2$ fed to it. In this way, the advantages already explained above for the other transmission direction or for the embodiment according to FIG. 1 are produced.

However, it is not absolutely necessary in the dual-fiber working variant according to FIG. 2 that the optical signals $P'_1$ or $P'_2$ transmitted from the protection-path connection node have respectively different optical carrier wavelengths than P1 and P2. If one assumes that the signal transmission is enabled in the protection-path connection node only when the signal transmission in the working path 7, 7a is definitely interrupted, then signal transmission can also be performed with the same optical carrier wavelength, without running the risk of disadvantages.

Figure 3:
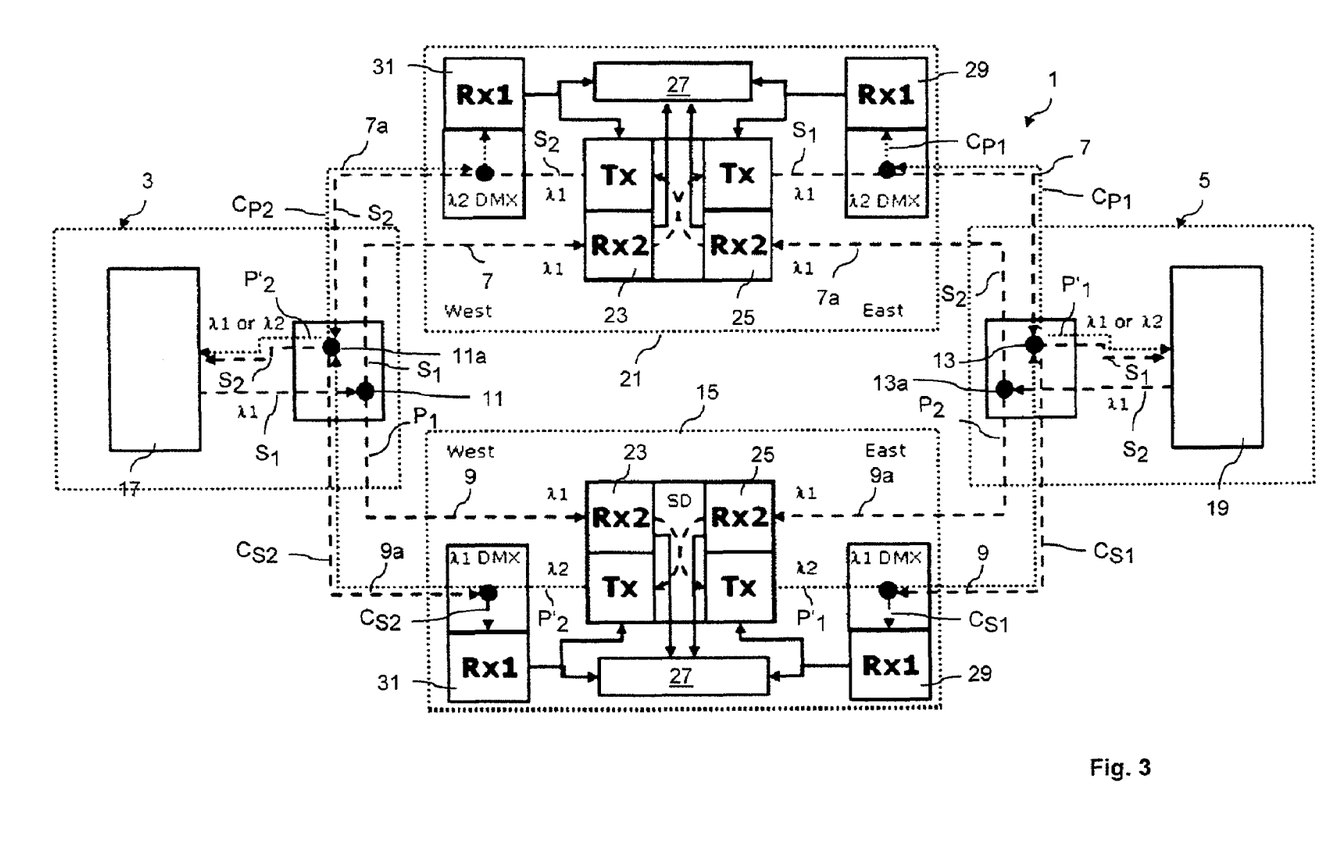
FIG. 3 is an embodiment similar to that shown in FIG. 2, but with an additional working-path connection node.

FIG. 3 shows an optical transmission path 1 similar to the variant according to FIG. 2, wherein the bidirectional signal transmission likewise takes place in the dual-fiber working path. In addition, however, a working-path connection node 21 is also provided in the working path 7, 7a. For reasons of simplicity and better readability of the drawing, only the pure signal paths are drawn in FIG. 3.

Thus, with respect to signal processing, reference is made to a large extent to the statements in connection with the embodiment according to FIG. 2.

In contrast to the embodiment according to FIG. 2, for the transmission path according to FIG. 3, however, a working-path connection node 21 is used that can be enabled/disabled with respect to both transmission directions and that has a practically identical construction as the protection-path connection node, apart from the wavelength selectivity of the splitter units used in the detector units (see below).

The working-path connection node 21 allows it to determine whether the signal transmission functions correctly via the protection path 9, 9a, wherein, for the loss of a transmission direction, the relevant transmission direction via the working path 7, 7a can be switched through or enabled in the working-path connection node.

For this purpose, an east-side protection-path control signal $C_{P1}$ is fed at its east-side port to the working-path connection node 21. This is produced as an optical sub-signal on the relevant path-side port of the splitter unit 13 in the second terminal node 5 to which the signal $P'_1$ is fed from the protection-path connection node 15. If the control signal $C_{P1}$ is omitted, then in the working-path connection node 21 it is assumed that the transmission direction via the protection path 9 is noisy and thus must be replaced by the signal transmission via the working path 7 through a corresponding enabling of signal transmission in the working-path connection node 21.

In the same way, a west-side protection-path control signal $C_{P2}$ is fed on its west-side port to the working-path connection node 21. The control signal $C_{P2}$ is produced by splitting the signal $P'_2$ fed from the protection-path connection node to the splitter unit 11a.

In the working-path connection node 21, if the loss or absence of the control signal $C_{P2}$ is detected, then it is assumed that the signal transmission via the protection path 9a from the second terminal node 5 to the first terminal node 3 is noisy. Thus, in the working-path connection node 21, the signal transmission via the working path 7a is switched through or enabled.

From FIG. 3, the detailed construction of the connection node 15 or 21 is visible, wherein it always involves purely schematic block diagrams. In each connection node there is a west-side transceiver unit and an east-side transceiver unit 23 and 25, respectively. Each of the transceiver units 23, 25 comprises a receiver unit Rx2 and a transmitter unit Tx. In addition, in each connection node 15, 21 there is a control unit 27 that is connected to the transceiver units 23, 25.

Each connection node 15, 21 also has available an east-side and a west-side detector unit 29, 31 for detecting the fed control signal $C_{S1}$, $C_{S2}$, $C_{P1}$, $C_{P2}$. Each detector unit 29, 31 has available an optical splitter unit that may be constructed as a wavelength-selective splitter unit λ1_DMX or λ2_DMX. The relevant control signal $C_{S1}$, $C_{S2}$, $C_{P1}$, $C_{P2}$ is fed to each of the splitter units λ1_DMX or λ2_DMX at the relevant east-side or west-side port of the connection node 15 or 21. If the optical signals transmitted by the optical transmitter units Tx of the transceiver units 23, 25 of the protection-path connection node 15 have a different optical carrier wavelength (λ2) than the other optical signals (λ1), then through a corresponding selection of the wavelength selectivity in the splitter units λ1_DMX in the connection node 15, only the corresponding control signal $C_{S1}$ or $C_{S2}$ can be branched in the direction of a receiver unit Rx1 that is likewise included by the east-side or west-side detector unit 29 or 31. The signals of the wavelength λ2 transmitted by the transmitter units Tx of the transceiver units 23, 25 can be guided in this case at best with a slight attenuation via the splitter units λ1_DMX in the direction toward the relevant terminal node.

In the case of the working-path connection node 21, an analogous behavior is produced with respect to the control signals $C_{P1}$ or $C_{P2}$, wherein, by means of the wavelength-selective optical splitter units λ2_DMX of the east-side or west-side detector unit 29 or 31, only the control signal $C_{P1}$ or $C_{P2}$ must be branched, while the optical signals that are transmitted by the transmitter units Tx of the transceiver units 23, 25 in the direction of the relevant terminal node are likewise transmitted with a slight insertion attenuation via the wavelength-selective splitter units λ2_DMX.

The detector units 29, 31 deliver a signal to the control units 27 of the connection node 15 or 21, wherein these signals transmit to the control units 27 the information whether the relevant control signal is present (or is correct) or not. For the possibly necessary switching of the signal transmission via the relevant connection node 15 or 21 in a specified transmission direction, the control unit 27 drives the transmitter units Tx in a corresponding way. For example, if the signal transmission via the working path 7 is to be switched through in the direction from the first terminal node 3 to the second terminal node 5, then the control unit 27 of the connection node 21 activates the transmitter unit Tx of the transceiver unit 25 of the connection node 21. In the same way, the control unit 27 also activates the transmitter unit Tx of the transceiver unit 23, when signal transmission from the second terminal node 5 to the first terminal node 3 is to be enabled.

Changing the signal transmission from the working path 7, 7a to the protection path 9, 9a or vice versa in a certain transmission direction is performed, as explained above, when the corresponding control unit 27 in one of the connection nodes 15 or 21 detects the loss of the relevant control signal $C_{S1}$, $C_{S2}$, $C_{P1}$, $C_{P2}$. At the same time, the control unit can test the quality of the signal to be switched through, as an additional necessary requirement for the switching. For this purpose, a corresponding quality signal is transmitted from the associated receiver unit Rx2 to the control unit. The quality signal can be constructed as a simple binary signal, where, for example, the logic state "0" signals that there is not sufficient signal quality and the logic state "1" signals that there is sufficient signal quality. The control unit then activates the relevant transmitter unit Tx of the associated transceiver unit 23, 25 only when sufficient signal quality is also signaled.

Figure 4:
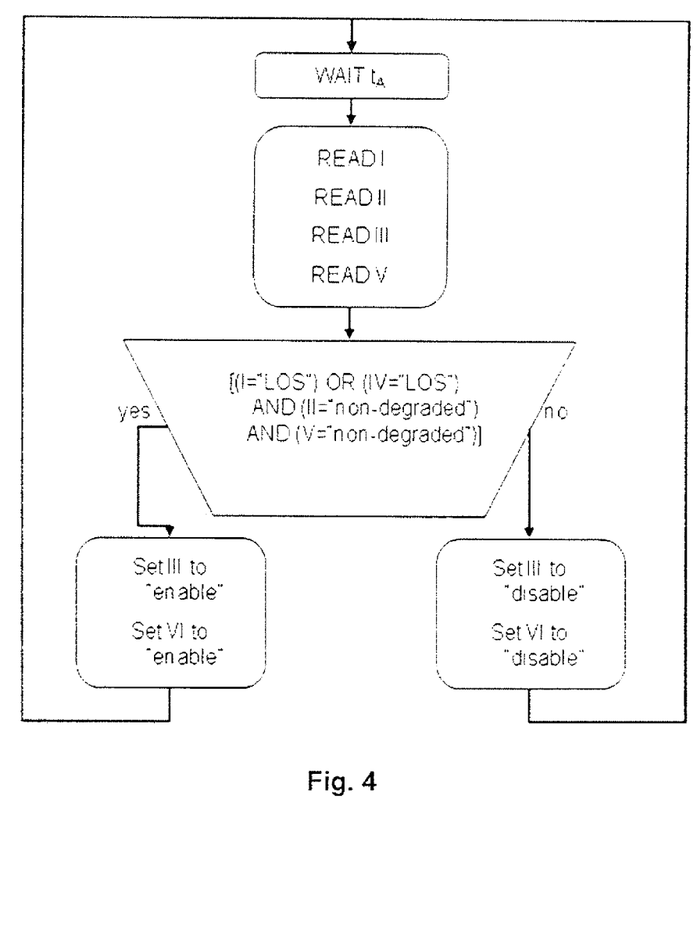
FIG. 4 is a schematic flow chart for the method of enabling or disabling the signal transmission via a connection node.

In FIG. 4 a flow chart is illustrated schematically that shows a loop that can be executed both when starting up the entire transmission path (for example, after a loss of power) and also can be executed continuously during operation of the transmission path in each of the control units 27 of the connection node 15 or 21.

In this variation, it is assumed that, for detection of the loss of one of the working-path control signals $C_{S1}$ or $C_{S2}$, both transmission directions must be switched to signal transmission via the protection path and for loss of one of the protection-path control signals $C_{P1}$ or $C_{P2}$, both transmission directions must be switched to the working path.

In this variation, each connection node initially waits for a different, specified waiting time $t_A$ (for the connection node 21) or $T_b$ for the connection node 15. The use of a different waiting time guarantees with sufficiently high certainty that both nodes do not react in the same way at the same time, wherein unnecessary and optionally multiple switching back and forth would be produced, which may even result, in an extreme case, in an infinite loop.

After waiting, initially the input signals I, II, III, and V are read in the relevant node by means of the control unit 27, wherein the signals I and IV involve the signals of the detector units 29, 31. These signals can signal the "LOS" state (Loss of Signal) for the relevant control signals $C_{S1}$, $C_{S2}$, $C_{P1}$, $C_{P2}$. In addition, the quality signals II and V are read by the control unit 27, with these signals being delivered by the receiver units Rx2 of the transceiver units 23, 25. Then, for the case that one of the control signals $C_{S1}$, $C_{S2}$ or one of the control signals $C_{P1}$, $C_{P2}$ signals a Loss of Signal and for the case that the signal quality of both signals to be switched through is to be viewed as "non-degraded," an activation of the previously deactivated transmitter units Tx of the transceiver units 23, 25 is performed. For this purpose, the control unit 27 drives the transmitter units Tx accordingly, wherein these signals are designated in the flow chart with III and VI. If this condition is not fulfilled, then the transmitter units remain deactivated, so that the signal transmission must take place via the corresponding other path (or two other sub-paths) or the signal transmission is no longer possible in the case of defects in both paths.

Therefore, through the presence of control units that are independent from each other in the connection node 15 or 21, the invention allows testing of the signal transmission in the corresponding other path to be performed, wherein the corresponding transmission signals of the other path are fed to the "control path" as a control signal in the opposite direction. Thus, in the terminal node and thus at the site of the subscriber, the use of active equipment can be eliminated.

As used herein, the terms "comprising," "including," "carrying," "having," "containing," "involving," and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for 1+1 protection of an optical transmission path, the method comprising:
   (a) transmitting a first optical transmission signal from a first terminal node at a first end of the optical transmission path to a second terminal node at a second end of the optical transmission path, the transmission occurring in a working mode via a working path;
   (b) switching the optical transmission path from the working mode to a protection mode in the case of an interruption in the transmission of the first optical transmission signal via the working path, the protection mode enabling the first optical transmission signal to be transmitted via a protection path connecting the first terminal node to the second terminal node, the protection path being separate from the working path;

(c) splitting the first optical transmission signal in the first terminal node, and feeding the first optical transmission signal to both the working path and the protection path;

(d) disabling, in the working mode, a protection-path connection node, the protection-path connection node adapted to be enabled or disabled so as to respectively transmit or disallow the first optical transmission signal fed to the protection-path connection node from the first terminal node in the direction toward the second terminal node;

(e) splitting the first optical transmission signal received at the second terminal node into a first optical sub-signal and a second optical sub-signal;

(f) processing the first optical sub-signal in the second terminal node as a first reception signal;

(g) feeding the second optical sub-signal as an east-side working-path control signal via the protection path to the protection-path connection node; and (h) detecting, in the protection-path connection node, whether the east-side working-path control signal is absent, the absence of the east-side working-path control signal being a necessary condition to enable the protection-path connection node to transmit the first optical transmission signal via the protection-path connection node in the direction toward the second terminal node.

2. The method of claim 1, wherein:

(a) the optical transmission path has a bidirectional construction wherein:

(i) in working mode, a second optical transmission signal is transmitted from the second terminal node via the working path to the first terminal node;

(ii) in the case of an interruption in the second optical transmission signal being transmitted via the working path, the optical transmission path is switched from the working mode to the protection mode, the protection mode enabling the second optical transmission signal to be transmitted from the second terminal node to the first terminal node;

(b) in the second terminal node, the second optical transmission signal is split optically and fed to both the working path and the protection path;

(c) the protection-path connection node is further adapted to be enabled and disabled so as to respectively transmit or disallow the second optical transmission signal fed to the protection-path connection node from the second terminal node in the direction toward the first terminal node, the protection-path connection node being disabled in the working mode;

(d) the second optical transmission signal received at the first terminal node is split optically into a third optical sub-signal and a fourth optical sub-signal;

(e) the third optical sub-signal is further processed in the first terminal node as a second reception signal;

(f) the fourth optical sub-signal is fed as a west-side working-path control signal to the protection-path connection node via the protection path; and (g) in the protection-path connection node, the presence or absence of the west-side working-path control signal is detected, the absence of the west-side working-path control signal being a necessary condition to enable the protection-path connection node to transmit the second optical transmission signal through the protection-path connection node in the direction toward the first terminal node.

3. The method of claim 2, further comprising:

(a) testing the necessary conditions for the enabling or disabling of the signal transmission in the direction of the first or second or both terminal nodes, the testing being in the protection-path connection node and in the working-path connection node; and (b) after the start of such testing, waiting for different specified delay times or randomly selected delay times within a specified permissible range before conducting another testing process.

4. The method of claim 3, wherein the testing processes in the protection-path connection node are repeated in the scope of loops to be executed cyclically, wherein the execution of the loops is started with the enabling of the protection-path connection node.

5. The method of claim 1, wherein:

(a) in the working path, there is a working-path connection node;

(b) the second optical transmission signal fed to the protection path is transmitted to the second terminal node via the protection path and split optically in the second terminal node into a third optical sub-signal and a fourth optical sub-signal;

(c) the third optical sub-signal is further processed in the second terminal node as a third reception signal;

(d) the fourth optical sub-signal is fed as a second east-side protection-path control signal via the working path to the working path-connection node; and (e) in the working-path connection node, the presence or absence of the second east-side protection-path control signal is detected, the absence of the second east-side protection-path control signal being a necessary condition to enable the working-path connection node to transmit the second optical transmission signal through the working-path connection node in the direction toward the second terminal node.

6. The method of claim 1, wherein:

(a) in the protection-path connection node, a signal quality of the first optical transmission signal is tested; and (b) the protection-path connection node allows the first optical transmission signal to be transmitted through the protection-path connection node in the direction toward the second terminal node only when the signal quality has reached or exceeded a specified value.

7. An optical transmission path with 1+1 protection, the optical transmission path comprising:

(a) a first terminal node at a first end of the optical transmission path that is connected for transmitting a first optical transmission signal in a working mode of the optical transmission path via a working path to a second terminal node at a second end of the optical transmission path, the first terminal node being connected for transmitting the optical transmission signal in a protection mode of the transmission path via a protection path to the second terminal node;

(b) a first 1×2 splitter unit in the first terminal node, the first 1×2 splitter unit adapted to receive, at a node-side port, the optical transmission signal, wherein a first of two path-side ports of the first 1×2 splitter unit is connected to the working path, and a second of the two path-side ports of the splitter unit is connected to the protection path;

(c) a protection-path connection node connected in the protection path and adapted to be enabled or disabled so as to respectively transmit or disallow the first optical transmission signal fed to the protection-path connection node from the first terminal node in the direction toward the second terminal node;

(d) a second 1×2 splitter unit in the second terminal node, the second 1×2 splitter unit adapted to receive, at a first of two path-side ports of the splitter unit, the optical transmission signal received via the working path, wherein a node-side port of the second 1×2 splitter unit is connected to a receiver unit of the second terminal node and a second of the two path-side ports is connected to the protection path, the second 1×2 splitter unit further adapted to split the optical transmission signal into a first optical sub-signal and a second optical sub-signal and to feed the second optical sub-signal as an east-side working-path control signal to the protection-path connection node via the protection path; and (e) a first control unit for detecting the interruption in the first optical transmission signal being transmitted via the working path, and for switching from the working mode to the protection mode when an interruption is detected in the transmission of the first optical transmission signal via the working path, the first control unit being located in the protection-path connection node, wherein the control device comprises a first detector unit for detecting the east-side working-path control signal and means for enabling or disabling the optical transmission signal being transmitted via the protection-path connection node in the direction of the second terminal node; and wherein the first control unit is adapted to enable the optical transmission signal to be transmitted via the protection-path connection node when the detector unit detects no east-side working-path control signal.

8. The optical transmission path of claim 7, wherein:
(a) the optical transmission path has a bidirectional construction, wherein, in the second terminal node, a second optical transmission signal to be transmitted to the first terminal node is fed to the node-side port of the second 1×2 splitter unit, and the second optical transmission signal is split and fed via the two path-side ports to the working path and to the protection path;
(b) the protection-path connection node is adapted to be enabled or disabled to respectively transmit or disallow the second optical transmission signal fed to the protection-path connection node from the second terminal node in the direction of the first terminal node;
(c) the second optical transmission signal received at the first terminal node is fed to the first path-side port of the first 1×2 splitter unit and split into a third optical sub-signal and a fourth optical sub-signal;
(d) the third optical sub-signal is fed to the node-side port of the first 1×2 splitter unit and to a receiver unit connected to this splitter unit in the first terminal node;
(e) the fourth optical sub-signal is fed to the second path-side port of the first 1×2 splitter unit and, via the protection path, to the protection-path connection node as a west-side working-path control signal;
(f) the first control unit further comprises a second detector unit for detecting the west-side working-path control signal and a means for enabling or disabling the second optical transmission signal to be transmitted via the protection-path connection node in the direction of the first terminal node; and
(g) the first control unit is adapted to enable the optical signal transmission to be transmitted via the protection-path connection node in the direction of the first terminal node, when the detector unit detects no west-side working-path control signal.

9. The optical transmission path of claim 7, wherein:
(a) the optical transmission path has a bidirectional construction, and in the second terminal node, there is a third optical 1×2 splitter unit to which a second optical transmission signal to be transmitted is fed at a node-side port, wherein the first of two path-side ports of the third 1×2 splitter unit is connected to an additional working path and the second of the two path-side ports of the third 1×2 splitter unit is connected to an additional protection path;
(b) the protection-path connection node is further adapted to be enabled or disabled to respectively allow or disallow the transmission of the second optical transmission signal through the additional protection path in the direction of the first terminal node;
(c) in the second terminal node, there is a fourth 1×2 splitter unit to which the second optical transmission signal is transmitted via the working path, wherein a node-side port of the fourth 1×2 splitter unit is connected to a receiver unit in the second terminal node;
(d) the second optical transmission signal received at the first terminal node is fed to the first path-side port of the fourth 1×2 splitter unit and split into a third optical sub-signal and a fourth optical sub-signal;
(e) the third optical sub-signal is fed to the node-side port of the fourth 1×2 splitter unit and to a second receiver unit connected to the fourth 1×2 splitter unit in the first terminal node;
(f) the fourth optical sub-signal is fed to the second path-side port of the fourth 1×2 splitter unit and, via the protection path, to the protection-path connection node as a west-side working-path control signal;
(g) the first control unit comprises a second detector unit for detecting the west-side working-path control signal and a means for enabling or disabling the second optical transmission signal to be transmitted via the additional protection path in the direction of the first terminal node; and
(h) the first control unit is adapted to enable the second optical signal transmission to be transmitted via the additional protection path in the direction of the first terminal node, when the detector unit detects no west-side working-path control signal.

10. The optical transmission path of claim 7, wherein:
(a) the first terminal node is further adapted to transmit a second optical signal via the protection path from the first terminal node to the second 1×2 splitter unit at the second terminal node, and the second 1×2 splitter unit is further adapted to split the second optical signal into a third optical sub-signal and a fourth optical sub-signal, wherein the fourth optical sub-signal is fed via the working path to a working-path connection node as an east-side protection-path control signal;
(b) the working-path connection node has a second control unit that comprises a third detector unit for detecting the east-side protection-path control signal and a means for enabling or disabling the transmission of the third optical signal via the working-path connection node in the direction of the second terminal node, the transmission being disabled in protection mode; and
(c) the second control unit is adapted to enable the transmission of the third optical signal via the working-path connection node in the direction of the second terminal node, when the third detector unit detects no east-side working-path control signal.

11. The optical transmission path of claim 10, wherein:
(a) a third optical signal transmitted via the protection path from the second terminal node to the first is split into a fifth optical sub-signal and a sixth optical sub-signal, wherein the sixth optical sub-signal is fed in the protection mode to the working-path connection node via the working path as a west-side protection-path control signal;
(b) the second control unit is additionally capable of detecting the second west-side protection-path control signal and enabling or disabling the transmission of the third optical signal via the working-path connection node in the direction of the first terminal node; and
(c) the second control unit is adapted to enable the transmission of the third optical signal via the working-path connection node in the direction of the first terminal node when the second control unit detects no second west-side working-path control signal.

12. The optical transmission path of claim 7, wherein:
(a) in the protection-path connection node or in the working-path connection node, there is an allocated receiver unit and an allocated transmitter unit for each transmission direction;
(b) wherein the first optical transmission signal to be transmitted from the first terminal node to the second terminal node is fed to the receiver unit; and
(c) wherein the receiver unit is adapted to convert the first optical transmission signal into an electrical signal and feeds the electrical signal directly or after signal processing to the transmitter unit that can be enabled/disabled by the control unit.

13. The optical transmission path of claim 12, wherein:
(a) the electrical signal is fed to the control unit; and
(b) the control unit is adapted to detect the signal quality of the signal, and to use the reaching or exceeding of a specified level for the signal quality as an additional necessary condition for enabling the protection-path connection node to transmit the first optical transmission signal via the protection path.

14. The optical transmission path of claim 12, wherein the transmitter unit of the protection-path connection node has an optical wavelength differing from the optical wavelength of each reception signal.

15. The optical transmission path of claim 7, wherein the first detector unit comprises an optical splitter capable of splitting the east-side working path control signal into a first detector sub-signal and a second detector sub-signal, and the optical splitter feeds the first detector sub-signal to an optical receiver unit that is adapted to convert the optical sub-signal into an electrical signal and to detect the presence of this electrical signal and feeds a signal to the control unit indicating whether an optical signal was detected or not.

* * * * *